(12) United States Patent
Lieber

(10) Patent No.: US 6,738,475 B1
(45) Date of Patent: May 18, 2004

(54) TELECOMMUNICATION TERMINAL

(75) Inventor: Markus Lieber, Lahstedt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/647,619

(22) PCT Filed: Apr. 6, 1999

(86) PCT No.: PCT/DE99/01034

§ 371 (c)(1),
(2), (4) Date: Dec. 7, 2000

(87) PCT Pub. No.: WO99/52257

PCT Pub. Date: Oct. 14, 1999

(30) Foreign Application Priority Data

Apr. 3, 1998 (DE) .......................... 198 15 014

(51) Int. Cl.⁷ ................................ H04M 1/00
(52) U.S. Cl. ............................. 379/428.01; 379/433.01; 455/90
(58) Field of Search ............................. 379/419, 387.01, 379/424, 428.02, 428.03, 428.04, 429, 433.01, 433.04, 433.06, 433.07, 433.1, 373.01, 373.02, 373.03; 455/90, 566, 556, 567, 95, 575

(56) References Cited

U.S. PATENT DOCUMENTS

| | | | |
|---|---|---|---|
| 4,531,034 A | 7/1985 | Inaba | |
| 4,679,231 A * | 7/1987 | Reichle | 379/396 |
| 4,924,044 A | 5/1990 | Takahashi et al. | |
| 4,982,424 A | 1/1991 | Saito et al. | |
| 5,235,636 A * | 8/1993 | Takagi et al. | 379/368 |
| 5,517,551 A | 5/1996 | Arai | |
| 5,708,428 A * | 1/1998 | Phillips | 379/368 |
| 5,717,753 A * | 2/1998 | Birmanns | 379/419 |
| 5,844,166 A * | 12/1998 | Halttunen et al. | 455/301 |
| 6,011,961 A * | 1/2000 | Kaschke | 455/60 |

FOREIGN PATENT DOCUMENTS

| | | |
|---|---|---|
| EP | 0 438 670 | 7/1991 |
| EP | 0 526 715 | 2/1993 |

* cited by examiner

Primary Examiner—Rexford Barnie
(74) Attorney, Agent, or Firm—Kenyon & Kenyon

(57) ABSTRACT

A telecommunications terminal particularly a mobile telephone, makes for improved user guidance. The telecommunications terminal includes at least one light source which visually signals an operating state of the telecommunications terminal. At least one key of transparent material is further provided. The light source illuminates the key as a function of the operating state of the telecommunications terminal if a function assigned to this operating state can be triggered by actuating the key.

7 Claims, 1 Drawing Sheet

TELECOMMUNICATION TERMINAL

BACKGROUND INFORMATION

A support for a telephone handset in which a handset rests on a pin that terminates in a plate is described in European Patent No. EP 0 526 715. The plate and the pin can be made of a transparent or translucent plastic. The use of a translucent or transparent material makes it possible to illuminate the plate and possibly also the pin by a light source appropriately disposed inside the telecommunications terminal. This can be used, for example, for the visual signaling of a call.

SUMMARY OF THE INVENTION

In contrast, the telecommunications terminal according to the present invention has the advantage that at least one key made of transparent material is provided, and that the light source illuminates the key as a function of the operating state of the telecommunications terminal if actuating the key will trigger a function assigned to this operating state. In this way, individual keys can separately signal different states of the telecommunications terminal. As only those keys are illuminated that trigger a function assigned to the operating state concerned, this makes it easier for the user to select the control functions that are possible in this operating state by actuating the appropriate keys, and thus increases functional clarity.

It is especially advantageous that the light source visually signals an incoming call, that the light source illuminates the key when there is an incoming call, and that the incoming call is answered by actuating the key. In this way, the user knows immediately which key is to be actuated for an incoming call, since only this key is illuminated. Thus the user does not first have to search for the required key, with the result that functional clarity for the user is increased and the time needed to answer the call is reduced.

A further advantage is that the key rests on a switching mat that is transparent at least in the region of the key, and that the key encompasses a transparent thrust pad that serves to establish contact when the key is actuated. In this way, no additional light-conducting bodies are needed for the key to be illuminated by the light source, since the switching mat and the thrust pad also function as light guides. This eliminates the material and production cost and the space consumption associated with an additional light guide. The smaller space requirement is particularly advantageous for telecommunications terminals designed as mobile telephones, where it is especially important to keep size to a minimum.

Another advantage is that the printed circuit board has a bore in the region of the key, and that the light source is so arranged on the opposite side of the printed circuit board from the key that its light illuminates the key through the bore. In this way, the light source is protected against damage by the thrust pad when the key is actuated, and the delivery of the light from the light source to the key through the bore is ensured.

A further advantage is that the illumination of the key is extinguished when contact is established by actuating the key and if another operating state of the telecommunications terminal is initiated thereby. In this way, the user has a visual means of checking the successful actuation of the key.

A further advantage is that the illumination of the key is extinguished when an incoming call is answered by actuation of the key. In this way, the user has a visual means of checking for successful answering of the incoming call by actuating the key.

Another advantage is that the light source illuminates the key in a blinking manner. In this way, more effective visual signaling is possible, since the user's attention is drawn more closely to the prevailing operating state of the telecommunications terminal, for example, to the receipt of a call. This is especially important when there is no additional acoustical signaling. The prevailing operating state of the telecommunications terminal is still brought to the user's attention especially quickly by the blinking light.

THE DRAWINGS

DETAILED DESCRIPTION

Figure 1:
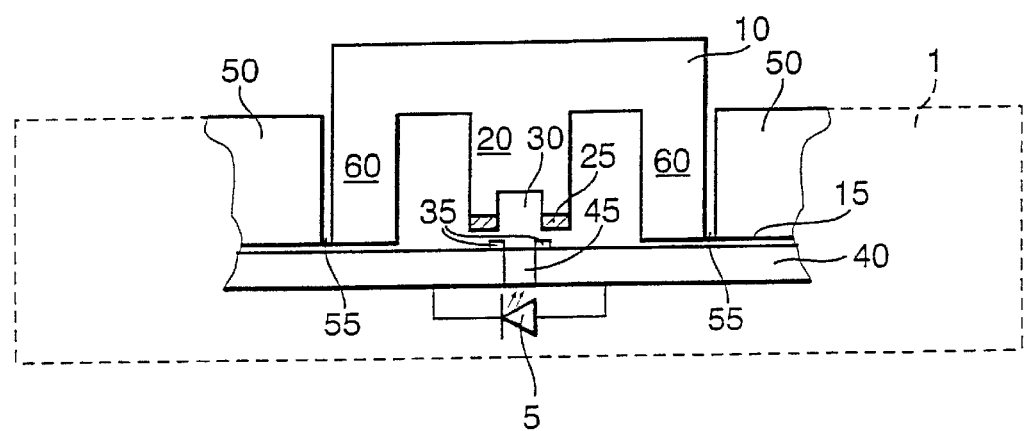
FIG. 1 is a side view of a telecommunications terminal according to the present invention.

In FIG. 1, a telecommunications terminal, which can be implemented, for example, as a mobile telephone, a cordless telephone, a radio, or the like is denoted by 1. Telecommunications terminal 1 includes a case 50 having a recess 55 in which a key 10 is guided. Key 10 forms a hollow body whose outer walls 60 are integrally connected to a switch mat 15 disposed inside case 50. Inside key 10 is a preferably cylindrical thrust pad 20, the so-called dome switch. The latter has a blind hole 30 on its end face facing printed circuit board 40. Key 10, switch mat 15 and dome switch 20 are made of an elastic, transparent material. Switch mat 15 can optionally also be made of a transparent material only in the region of dome switch 20. Dome switch 20 has on its front face an electrically conductive material 25, preferably graphite, arranged in a ring around an outer edge of blind hole 30. This material functions as an electrical contact. Switch mat 15 rests on a printed circuit board 40. Printed circuit board 40 has on its side facing key 10 two metallic counter-contacts 35 that are so arranged in the region of contact 25 that they are electroconductively interconnected by contact 25 when dome switch 20 is depressed appropriately. In this context, both counter-contacts 35 are arranged laterally at the edge of a bore 45 in printed circuit board 40. A light source 5 implemented as a light-emitting diode (LED), arranged, for example, as a surface-mounted device (SMD), is disposed on the side of printed circuit board 40 facing away from dome switch 20, LED 5 being located directly beneath bore 45, so that dome switch 20 can be illuminated by LED 5 via bore 45.

Figure 2:
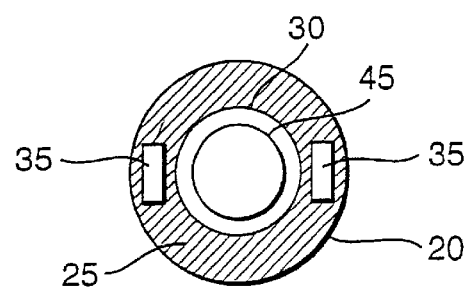
FIG. 2 is a plan view of a dome switch for establishing contact above a bore for the emergence of the light from a light source.

According to FIG. 2, the diameter of blind hole 30 in dome switch 20 is somewhat larger than the diameter of bore 45 in printed circuit board 40. The optical path of LED 5 is not obstructed by switching contact 25 on dome switch 20 or by laterally mounted counter-contacts 35 on printed circuit board 40, since these components do not lie within the optical path of LED 5. The light from LED 5 passes via bore 45 through blind hole 30 into dome switch 20 to illuminate key 10.

The described arrangement can be provided for additional keys of telecommunications terminal 1, in which case a plurality of keys of telecommunications terminal 1 can be illuminated by one LED 5 each.

LED 5 visually signals an operating state of telecommunications terminal 1. LED 5 illuminates key 10 as a function of the operating state of telecommunications terminal 1 if the actuation of key 10 will trigger a function assigned to that operating state. If key 10 is, for example, the call key of a mobile telephone, LED 5 visually signals an incoming call and illuminates key 10. The illumination can also be blinking in order to draw the user's attention to the incoming call. The visual signaling of an incoming call can be used together with the ring tone or by itself to signal an incoming call. If key 10 is now depressed in the direction of printed circuit board 40, then dome switch 20 depresses until contact 25 contacts counter-contacts 35. Due to the contact-making effected in such a manner, the incoming call is answered when the call key is actuated. This changes the operating state of telecommunications terminal 1. Telecommunications terminal 1 is now in a conversation state, i.e., in the state of an established telephone connection. In this case, the illumination of key 10 by LED 5 extinguishes, since actuation of the call key is not necessary in the conversation state and therefore is not offered to the user by illumination. When key 10 is released, it springs back to a starting position owing to its elasticity. At the same time, dome switch 20 springs back elastically and the contact between contact 25 and counter-contacts 35 is interrupted again.

The invention is not limited to telecommunications terminals implemented as telephone sets, but can be used for any desired telecommunications terminals, such as, for example, fax machines, pagers, etc.

Depending on the operating state of telecommunications terminal 1, more than one key 10 can also be illuminated if these keys trigger a function assigned to this operating state.

What is claimed is:

1. A telecommunications terminal comprising:
   a printed circuit board having a first side, a second side opposite the first side, and at least one bore;
   at least one light source electroconductively connected to the printed circuit board on the first side of the printed circuit board; and
   at least one key composed of a transparent material, the at least one key being arranged on the second side of the printed circuit board such that the at least one light source illuminates the at least one key through the at least one bore.

2. The telecommunications terminal according to claim 1, wherein the key includes a transparent thrust pad, wherein, when the key is actuated, the thrust pad presses at least one contact of the thrust pad against at least one counter-contact of the printed circuit board, causing contact to be made.

3. The telecommunications terminal according to claim 1, wherein the light source visually signals an operating state of the telecommunications terminal, the light source illuminating the key as a function of an operating state of the telecommunications terminal if a function assigned to the operating state can be triggered by actuating the key.

4. The telecommunications terminal according to claim 1, wherein the light source visually signals an incoming call, the light source illuminating the key when there is an incoming call, the incoming call being answered by actuating the key.

5. The telecommunications terminal according to claim 1, wherein the light source includes a light-emitting diode.

6. The telecommunications terminal according to claim 1, wherein the light source illuminates the key in a blinking manner.

7. The telecommunications terminal according to claim 1, wherein the telecommunications terminal is a mobile telephone.

* * * * *

UNITED STATES PATENT AND TRADEMARK OFFICE
CERTIFICATE OF CORRECTION

PATENT NO. : 6,738,475 B1
DATED : May 18, 2004
INVENTOR(S) : Markus Lieber

It is certified that error appears in the above-identified patent and that said Letters Patent is hereby corrected as shown below:

<u>Title page</u>,
Item [57], ABSTRACT,
Line 1, change "A telecommunications terminal" to -- A telecommunications terminal, --.

Signed and Sealed this

Twenty-second Day of March, 2005

JON W. DUDAS
*Director of the United States Patent and Trademark Office*